(No Model.) 7 Sheets—Sheet 1.

H. E. WAITE.
MAIL MARKING MACHINE.

No. 599,464. Patented Feb. 22, 1898.

WITNESSES:
A. D. Harrison.
P. W. Pezzetti.

INVENTOR:
H. E. Waite.
by
Wright Brown & Quinby
Attys (No Model.) 7 Sheets—Sheet 2.

H. E. WAITE.
MAIL MARKING MACHINE.

No. 599,464. Patented Feb. 22, 1898.

WITNESSES:
A. D. Harrison.
P. W. Pezzetti

INVENTOR
H. E. Waite
by Wright Brown Quinby
Attys (No Model.) 7 Sheets—Sheet 3.

H. E. WAITE.
MAIL MARKING MACHINE.

No. 599,464. Patented Feb. 22, 1898.

FIG. 4.

WITNESSES:
A. D. Harrison.
P. W. Pezzetti.

INVENTOR:
H. E. Waite
Cushright Brown & Quinby
attys.

(No Model.) 7 Sheets—Sheet 4.

H. E. WAITE.
MAIL MARKING MACHINE.

No. 599,464. Patented Feb. 22, 1898.

WITNESSES:
INVENTOR:
H. E. Waite (No Model.) 7 Sheets—Sheet 5.

H. E. WAITE.
MAIL MARKING MACHINE.

No. 599,464. Patented Feb. 22, 1898.

WITNESSES:
A. D. Harrison.
P. W. Pezzetti

INVENTOR:
H. E. Waite
by Wright Brown & Quinby
Attys.

THE NORRIS PETERS CO., PHOTO-LITHO., WASHINGTON, D. C.

(No Model.) 7 Sheets—Sheet 6.

H. E. WAITE.
MAIL MARKING MACHINE.

No. 599,464. Patented Feb. 22, 1898.

UNITED STATES PATENT OFFICE.

HENRY E. WAITE, OF NEWTON, MASSACHUSETTS.

MAIL-MARKING MACHINE.

SPECIFICATION forming part of Letters Patent No. 599,464, dated February 22, 1898.

Application filed December 3, 1897. Serial No. 660,718. (No model.)

*To all whom it may concern:*

Be it known that I, HENRY E. WAITE, of Newton, in the county of Middlesex and State of Massachusetts, have invented certain new and useful Improvements in Mail-Marking Machines, of which the following is a specification.

This invention relates to mail-marking machines of the type which is characterized by a horizontal flat conveyer which travels beneath a hopper and engages the letters which are deposited therein, carrying them forward edgewise and in a vertical posture to the marking devices.

It relates, further, to machines employing a printing-roll containing a printing-die and an impression-roll containing a movable impression-pad or platen which is automatically projected to the periphery of the impression-roll upon the approach of a letter, so as to coact with the printing-die in postmarking and stamp-canceling the letter, and at other times when no letter is present is retracted within the impression-roll, so as to avoid a deposit of ink from the die.

In connection with mail-marking machines of this type various expedients have been devised for timing the introduction of the letters between the printing-rolls, so as to affix the impression at the proper place on the letter, and it has been customary heretofore to locate these timing devices in advance of the printing-rolls.

The present invention has for its object to provide a mail-marking machine adapted to mark letters deposited intermittently and to time and feed these letters to the printing members by means of devices located on the same shafts with said members and independent thereof.

The invention also has for its object to provide certain improvements in the mechanism for controlling and operating the movable impression-pad or platen above referred to.

The invention consists in the novel features of construction and arrangement, which I will now proceed to describe and claim.

Of the accompanying drawings, forming a part of this specification, Fig. 9 represents a section on the line 9 9 of Fig. 4. Figs. 10 and 11 represent detail perspective views which will be hereinafter referred to.

The same reference characters indicate the same parts in all the figures.

Referring to the drawings, $a$ designates a table which supports the principal working parts, and $b$ designates the hopper into which the letters are deposited. There is arranged below the hopper in the usual manner a flat endless belt $c$, which carries the letters forward edgewise and in a vertical posture as they are successively dropped into the hopper.

Figure 1:
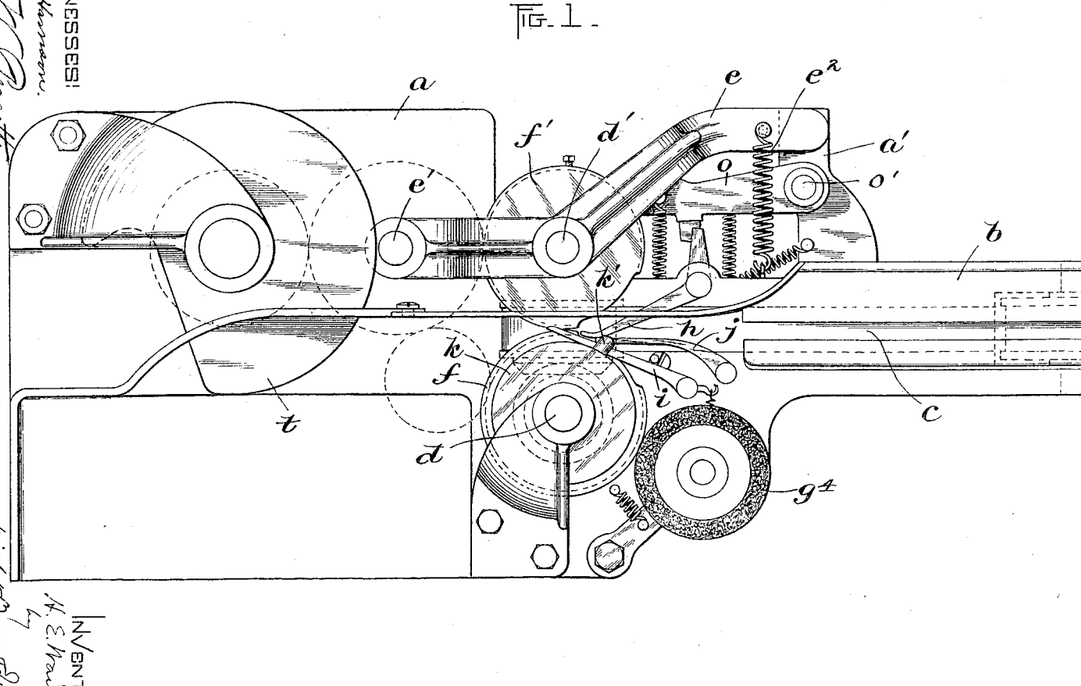
Figure 1 represents a plan view of a mail-marking machine constructed in accordance with my invention.
Figure 2:
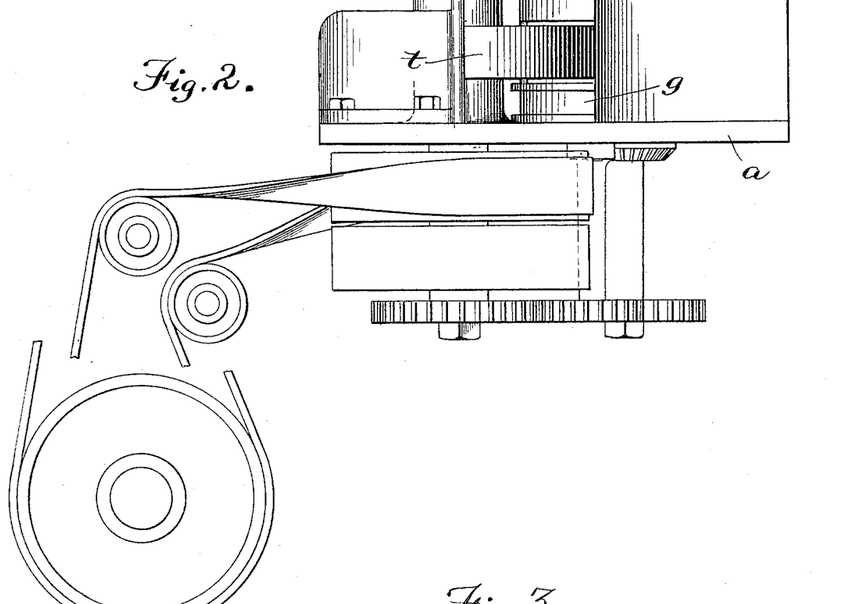
Fig. 2 represents an end view, on a larger scale, looking from the left in Fig. 1.

$d$ and $d'$ designate two vertical independently-driven shafts mounted on either side of the belt $c$, the shaft $d$ being mounted in fixed bearings, while the shaft $d'$ is mounted in a yoke-frame $e$, which is pivoted at $e'$ to the table and whose free end rests on a slide-plate $a'$. A spring $e^2$ exerts an inward tension on the yoke $e$, and the yoke and spring constitute a yielding bearing for the shaft $d'$, which allows letters of different thicknesses to pass between the printing and feed rolls, which are mounted on the shafts $d$ $d'$ and which will be hereinafter described. The arrangement of the driving-gears is indicated by dotted circles in Fig. 1.

In machines of the same general type as the one which is being described, as heretofore constructed, it has been common to have the feeding devices which time the letters in their introduction to the printing-rolls located in advance of said printing-rolls. In the present invention, however, the printing-rolls and the feeding devices are both located on the two shafts $d$ $d'$.

Figures 9, 10, 11:
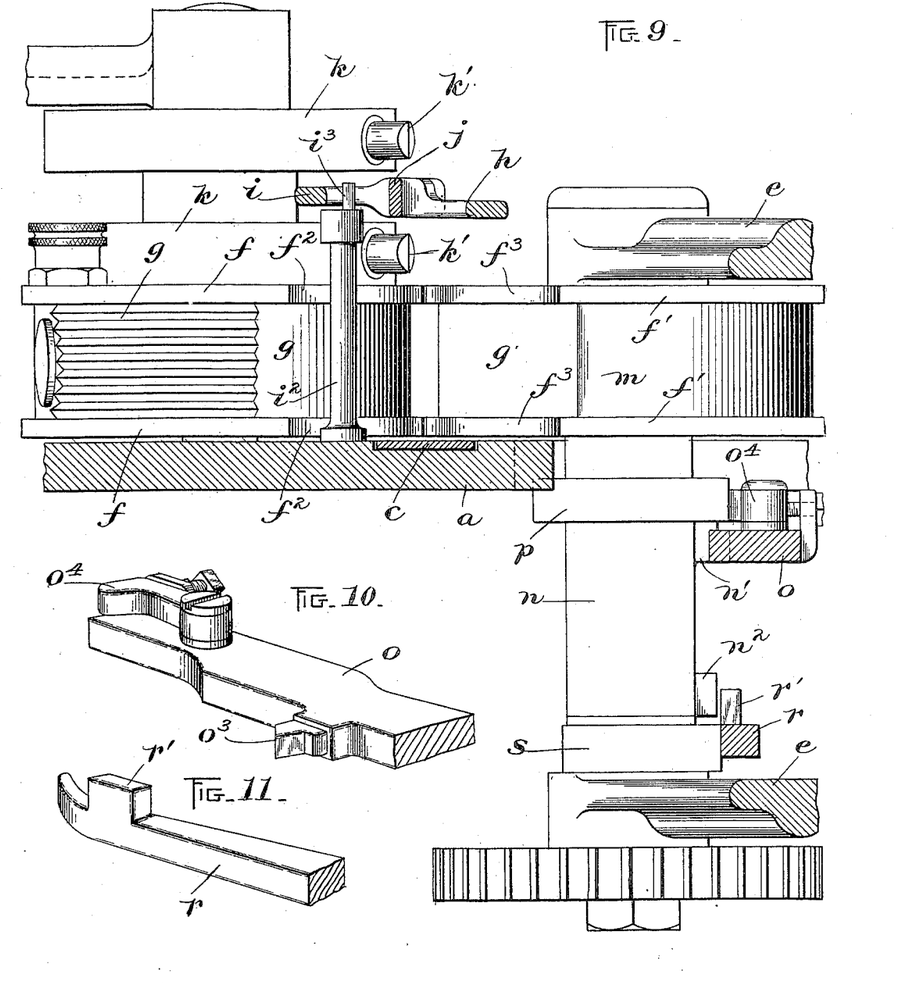

There are four feeding rolls or disks $f f f' f'$, (see Fig. 9,) arranged two on each shaft above and below the printing-rolls $g g'$. These disks coact to grip a letter on both sides and are recessed at $f^2 f^3$ to form segmental carrying-surfaces on the edges of the disks.

Figure 3:
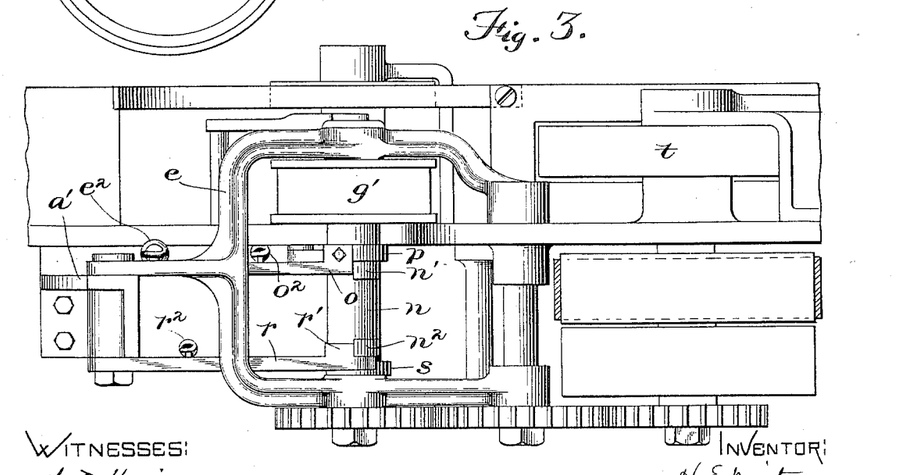
Fig. 3 represents a partial rear elevation.
Figure 4:
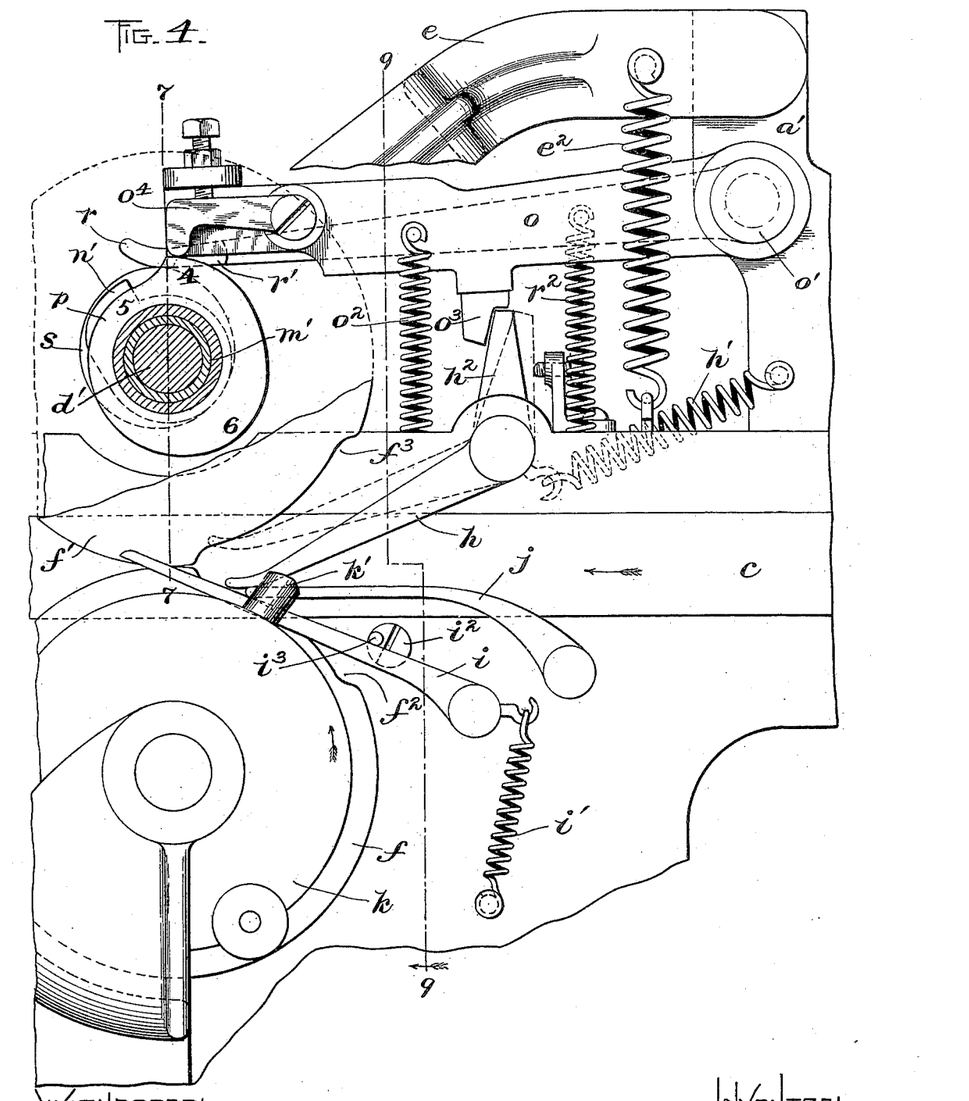
Fig. 4 represents a partial plan view of the machine with a portion of one of the feeding and marking rolls broken away.
Figure 5:
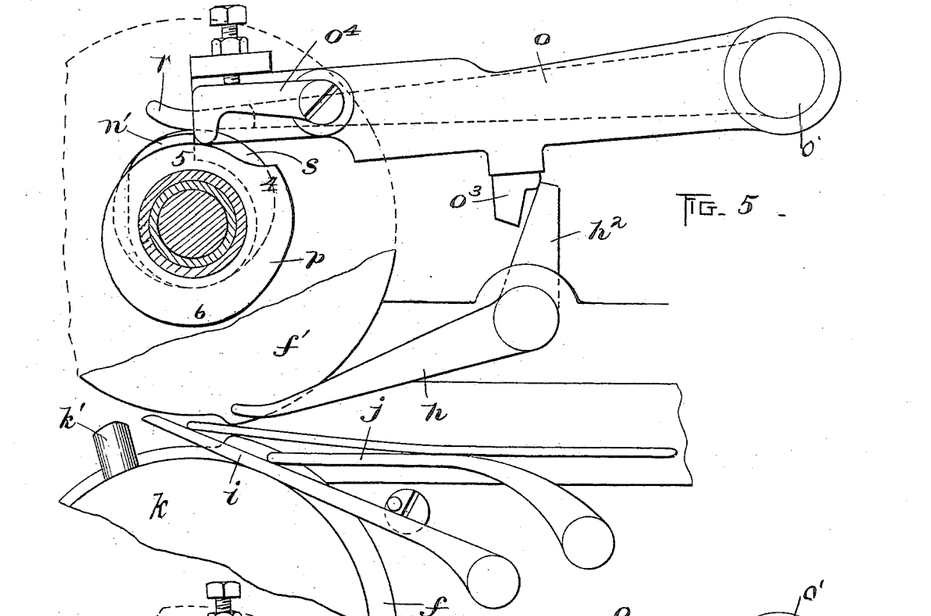
Figs. 5 and 6 represent plan views showing successive positions of some of the parts shown in Fig. 4.
Figure 6:
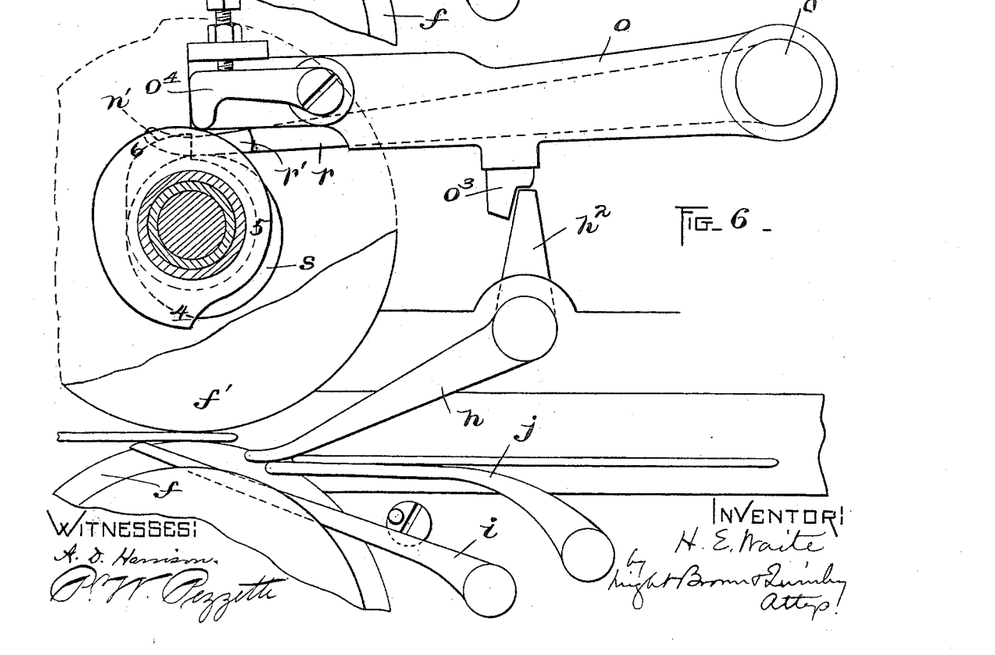
Figure 7:
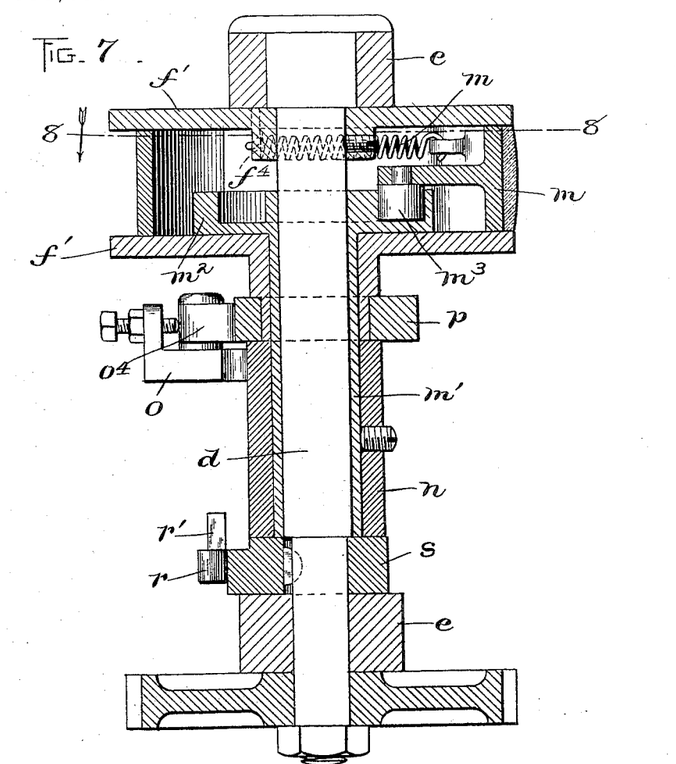
Fig. 7 represents a vertical section on the line 7 7 of Fig. 4.
Figure 8:
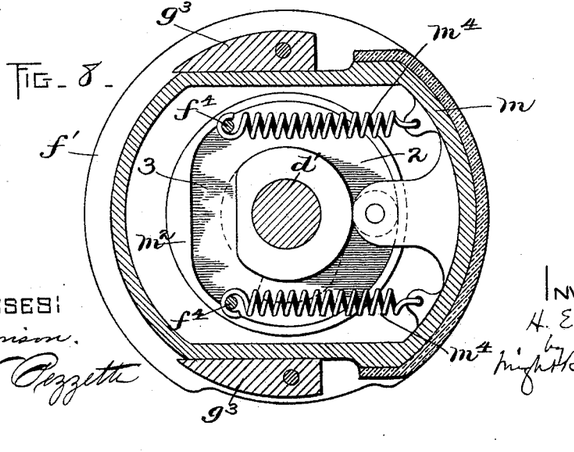
Fig. 8 represents a section on the line 8 8 of Fig. 7.

Above the throat formed between the opposing sets of disks are arranged two pivotal arms $h$ and $i$, (see Figs. 4, 5, and 6,) forming stops which act in conjunction with the feeding-disks to time the introduction of the letters between the printing devices. When a letter is dropped into the hopper, it travels along with the belt $c$ until it reaches the arm $h$, extending across the letter-path and yieldingly held by a spring $h'$ against a fixed arm $j$, parallel with the letter-path. If the printing-rolls at that moment are not in a position to receive the letter, it is detained for an instant at the apex of the two arms, as shown in Fig. 6. On the shaft $d$ above the feeding-disks are affixed two disks $k k$, one above and the other below the level of the arm $h$. Each of these disks is provided on its periphery with a stud or abutment $k'$, one stud being directly above the other and both of the same length. The purpose of these studs is to displace the arm $h$ at a predetermined time in the revolution of the printing-rolls when a letter is present at the apex of the arms $h$ and $j$, as above described. The studs strike the face of the letter when they have reached the position indicated in Fig. 4, (no letter being shown, however, in this figure,) and as said studs continue to revolve they push the letter aside and displace the arm $h$ from the letter-path, as indicated by broken lines in Fig. 4 or by full lines in Fig. 5. As soon as the arm $h$ is displaced the letter is advanced by the joint action of the belt $c$ and the studs $k'$ to the second stop or arm $i$, which arrests it for an instant until the forward ends of the segmental gripping portions of the disks $f f'$ come together, as shown in Fig. 5. The letter is then gripped between the disks and carried forward past the stop $i$, which is yieldingly held by a spring $i'$. A rotatable stud $i^2$, having an eccentric-pin $i^3$, is provided for adjusting the stop $i$ and thereby regulating the position of the postmark upon the letter. When no letter is present at the stop $h$, it is obvious that the studs $k' k'$ will pass on either side of said stop without displacing it. As the letter advances between the feeding-disks it is marked by the coaction of the printing devices carried by the printing-rolls $g g'$ and is then shot forward to the stacker $t$ to be stacked with other letters already marked. The printing devices consist of a canceling and postmarking die $g^2$, removably fixed on the periphery of the roll $g$, an ink-roll $g^4$, and a movable impression-pad or platen $m$, contained within the roll $g'$ and normally retracted from the periphery of said roll in an inoperative position, but adapted to be thrown out to coact with the die when a letter is present to be marked. The pad or platen itself and the method of mounting it described herein are already substantially known to the art; but the means for operating the pad are new and form a part of the present invention. The top and bottom walls of the impression-roll $g'$ are made by the feed-disks $f'$, the upper one of which is fixedly mounted on the shaft $d'$, while the lower disk is connected to the upper one by means of a pair of interposed blocks $g^3$. The blocks form a diametrical slideway for the platen $m$, which latter is composed of a skeleton frame having a segmental face and a yielding covering thereon. On the shaft $d'$ is loosely mounted a sleeve $m'$, which extends up into the impression-roll and is there formed with a path-cam $m^2$, having a groove in which operates a roller-stud $m^3$, mounted on a tongue projecting from the inside of the platen $m$. The sleeve $m'$ has sufficient frictional hold on the shaft $d'$ to revolve therewith, excepting when its revolution is interfered with. Attached to the lower end of the sleeve $m'$ by means of a set-screw is a collar or sleeve $n$, on which are formed two similar projections or stop-shoulders $n'$ $n^2$, (see Figs. 3 and 9,) one at each end of the collar. It will readily appear that as long as the sleeve $m'$ and collar $n$ are free to revolve with the shaft $d$ there will be no relative movement between the path-cam $m^2$ and the platen $m$; but as soon as the collar $n$ is held from revolution the cam will be arrested, and the stud $m^3$ will travel around in the groove of said cam. The said groove is formed with a long segmental portion or "dwell" 2 and a short straight portion 3. When the stud is in the dwell, the platen will be thrown out to the periphery of the impression-roll in a position to coöperate with the printing-die on the other roll; but when said stud is in the straight portion 3 the platen will be retracted.

A movable abutment, which is controlled by the approach of a letter, is arranged to be thrown into the path of the upper shoulder $n'$, so as to arrest the collar $n$ and accomplish the throwing of the platen or impression-pad. This abutment is formed by the end of an arm $o$, pivoted at $o'$ to the frame of the machine and provided with a spring $o^2$. This arm is controlled in its movements by the letter-stop $h$, on whose shaft is a post or trip $h^2$, normally engaging a catch $o^3$ on the arm $o$, and by a cam $p$, affixed to the hub of the lower feed-disk $f'$, and hence revolving with the shaft $d'$. An adjustable dog $o^4$ provides contact between the arm and cam. The cam $p$ is formed with two prominences 4 and 6 and a reduced portion 5. The edge of the cam breaks abruptly from the prominence 4 to the reduced portion 5 and then passes gradually from the latter to the prominence 6. The dog $o^4$ contacts with the two prominences 4 and 6 in every revolution of the shaft $d'$, but when the reduced portion 5 is reached the dog is normally prevented from following the edge of the cam by the trip $h^2$. When, however, the stop $h$ has been displaced by a letter, as shown in Fig. 5, the trip $h^2$ becomes disengaged from the catch $o^3$ and the inward movement of the arm $o$ is unobstructed. Accordingly when the prominence 4 passes the dog $o^4$, instead of the cam becoming then separated from the dog the latter follows the edge of the cam over the reduced portion 5, as shown in Fig. 5. The effect of this is to bring the end of the arm $o$ into contact with the shoulder $n'$, which action arrests the sleeve $n$ and the path-cam $m^2$ within the impression-roll. The roll itself and the platen $m$ continue to revolve and the stud $m^3$ starts from the straight portion 3 of the cam-groove into the segmental portion 2, thus throwing the platen out to the periphery of the impression-roll. When the cam $m^2$ has been held stationary during a complete revolution of the impression-roll, the stud $m^3$ again enters the straight portion of the cam-groove and the platen is retracted from the periphery of the roll. Before the roll completes a revolution, however, the protuberance 6 on the cam $p$ comes into contact with the dog $o^4$ and moves the arm $o$ outwardly out of engagement with the shoulder $n'$. This is necessary in order to enable the stop-arm $h$ to resume its normal position across the letter-path, as shown in Fig. 6, so as to arrest a letter which may be coming along immediately after the letter which first displaced the stop. Since this disengagement of the abutment-arm $o$ from the shoulder $n'$ takes place before the sleeve $n$ has been held for a sufficient length of time to retract the platen, it becomes necessary to provide mechanism to hold the sleeve for the remainder of the revolution of the impression-roll. This mechanism consists of an arm $r$, pivoted below the arm $o$ and provided with an upwardly-extending lug or abutment $r'$, and a cam $s$, keyed to the shaft $d'$ below the sleeve $n$ and arranged to operate the arm $r$. A spring $r^2$ holds the arm $r$ at all times against the edge of the cam, and the cam is so shaped that it allows the lug or abutment $r'$ to move into the path of the lower shoulder $n^2$ on the sleeve $n$ just before the arm $o$ moves out of engagement with the upper shoulder $n'$ on said sleeve. The sleeve therefore continues to be held in a stationary position after it is released by the arm $o$ (see Fig. 6) and is so held until the impression-roll has made a complete revolution and the platen has been retracted. The transition from the reduced portion of the cam $s$ to its protuberant portion is gradual, so that the arm $r$ begins to move outwardly immediately after it has reached its position nearest the shaft $d'$. Just as the sleeve $n$ reaches its original position relatively to the cams $p$ and $s$ (shown in Fig. 4) the abutment $r'$ moves out of the path of the shoulder $n^2$ and allows the sleeve to revolve with the shaft. Two springs $m^4$ $m^4$, attached to the platen-frame and to pins $f^4 f^4$ on the top feed-disk $f'$, assist in retracting the platen and serve to keep it from rattling.

Figure 12:
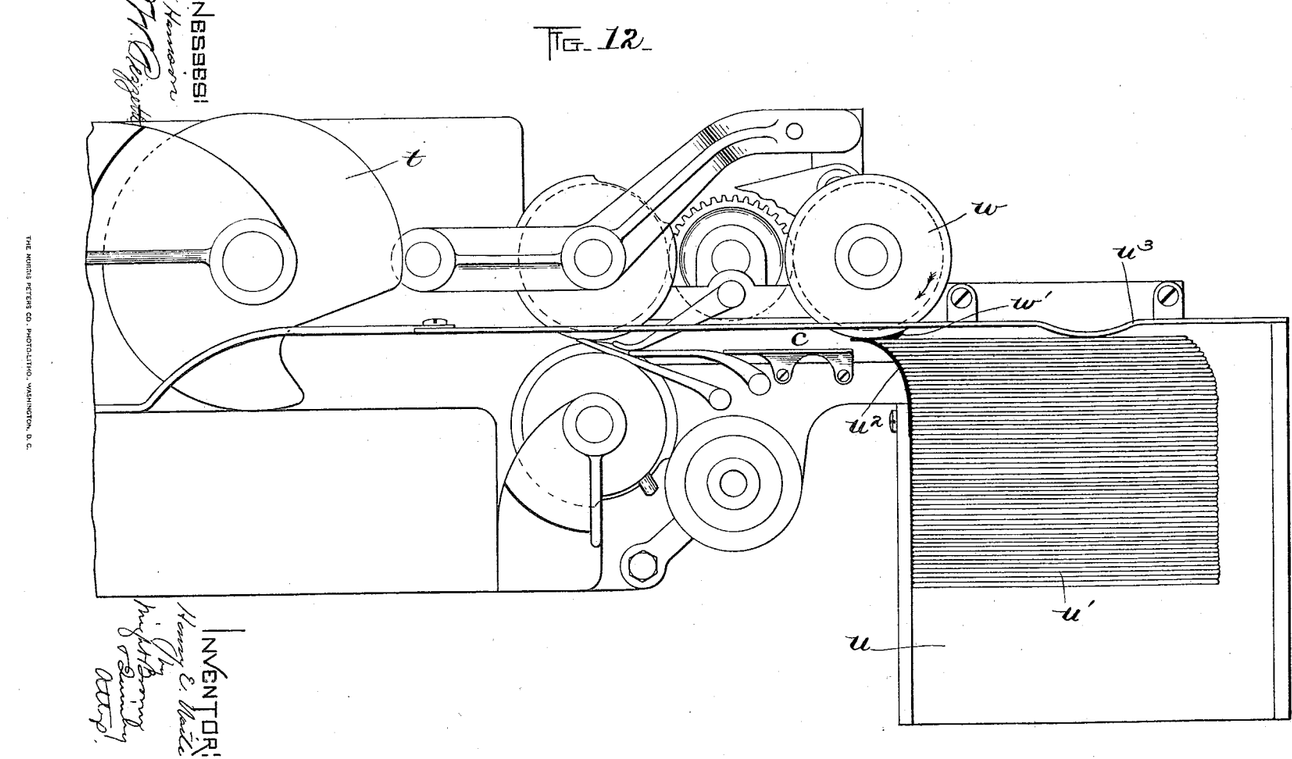
Fig. 12 represents a top plan view of a mail-marking machine constructed in accordance with my invention and provided with a self-feeding attachment.

In Fig. 12 is shown a machine similar to the one which has just been described, provided with a self-feeding attachment which is adapted to handle certain classes of mail-matter, such as circulars received in quantities, already faced. The attachment as here shown includes a trough or table $u$, on which a pack of letters $u'$ may be placed, a curved sheet-metal spring $u^2$, placed at the mouth of the trough to prevent the passage of more than one letter at a time, and a rotary feed-cylinder $w$, on whose periphery is located a soft-rubber button or stud $w'$. The pack of letters may be pressed up against the guide or fence $u^3$ at the end of the trough by the hand of the attendant or by means of a weighted follower or other device, and as the cylinder $w$ rotates in the direction of the arrow the stud $w'$ takes the letters off from the face of the pack one at a time and launches them upon the traveling belt $c$, which carries them past the timing-feed and between the marking-cylinders. The feed-cylinder $w$ is preferably timed to revolve in unison with the printing-cylinders, so that a letter passes between said cylinders at every revolution.

Having thus explained the nature of my invention and described a way of constructing and using the same, although without having attempted to set forth all the forms in which it may be embodied or all the modes of its use, I declare that what I claim is—

1. In a mail-marking machine, coöperating continuously-rotated feed-rolls located on opposite sides of the letter-path, in combination with two movable stops located in the throat between said feed-rolls, and devices on said feed-rolls adapted to coöperate with a letter in successively displacing the two stops.

2. In a mail-marking machine, two feed members located on opposite sides of the letter-path and having letter-engaging portions, a movable stop normally located in the letter-path in the throat between said feed members, a letter-displacing abutment located on the periphery of one of said feed members and adapted to coöperate with a letter in displacing said stop, and a second stop located beyond the first stop and adapted to arrest the letter after it has passed said first stop, and to hold the same until gripped between the letter-engaging portions of the feed members.

3. In a mail-marking machine, printing-rolls, one of which contains a movable platen or impression-pad, a normally inoperative mechanism for projecting said platen to the periphery of its roll, a trip controlling said mechanism, feed-rolls for advancing the letters to the printing-rolls, and a continuously-operated rotary device adapted to coöperate with a letter in displacing said trip to render the pad-projecting mechanism operative, previously to the introduction between and engagement by the feed-rolls of said letter.

4. In a mail-marking machine, a printing-roll carrying a die, an opposed roll carrying a movable platen or impression-pad, mechanism for throwing said pad into and out of operative relation to the printing-die, a letter-controlled trip which normally engages said mechanism to render the same inoperative, feed-rolls having segmental letter-engaging portions, and an abutment located on the same shaft with one of said rolls in advance of its letter-engaging portion, the said abutment being adapted to coöperate with a letter in displacing the trip and releasing the pad-throwing mechanism.

5. In a mail-marking machine, an impression-roll carrying a pad which is movable toward and away from the center of the roll, a sleeve loosely mounted on the shaft of said roll and carrying a cam which operates the pad, the pad being normally retracted and the sleeve revolving with the shaft, a letter-controlled abutment for engaging and arresting the sleeve, and a cam located on the roll-shaft for operating said abutment.

6. In a mail-marking machine, a movable platen, and mechanism for operating the same, comprising a normally progressive part connected with the platen, a shaft carrying two cams which revolve in unison, a stop member controlled by one of said cams in such a manner as to engage and arrest the progressive part during a portion of a revolution of the cams, and disengage the same during the remaining portion of the revolution, and a second stop member controlled by the other cam in such a manner as to engage the progressive part before the latter has been released by the first stop member, and continue to arrest the same after it has been released by said stop member, the progressive part being finally released by the second stop member when a revolution of the cams has been completed.

7. In a mail-marking machine, a movable platen, and mechanism for operating the same, comprising a rotary shaft, a platen-controlling sleeve loose on said shaft and normally revolving therewith, two cams affixed to said shaft, a pivoted arm provided with a stop portion and controlled by one of said cams in such a manner as to engage and arrest the sleeve during a portion of a revolution of the cams, and disengage the same during the remaining portion of the revolution, and a second pivoted arm provided with a stop portion and controlled by the other cam in such a manner as to engage the sleeve before the latter has been released by the first arm and continue to arrest the same after it has been released by said arm, the sleeve being finally released by the second arm when a revolution of the cams has been completed.

In testimony whereof I have signed my name to this specification, in the presence of two subscribing witnesses, this 15th day of November, A. D. 1897.

HENRY E. WAITE.

Witnesses:
R. M. PIERSON,
P. W. PEZZETTI.